United States Patent
Shenoy et al.

(10) Patent No.: US 9,488,947 B2
(45) Date of Patent: Nov. 8, 2016

(54) METHOD AND SYSTEM FOR MANAGING FIELD CONVERTIBLE CUSTOMER REPLACEABLE COMPONENTS

(75) Inventors: Nitin Shenoy, Webster, NY (US); Joanna Brown, Fairport, NY (US); Timothy Thomas, Fairport, NY (US); Cheryl Koenig, Ontario, NY (US); Michael Kirby, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1243 days.

(21) Appl. No.: 12/429,049

(22) Filed: Apr. 23, 2009

(65) Prior Publication Data

US 2010/0274600 A1   Oct. 28, 2010

(51) Int. Cl.
| | | |
|---|---|---|
| G03G 15/00 | (2006.01) | |
| G06Q 10/06 | (2012.01) | |
| G06Q 10/08 | (2012.01) | |
| G06Q 10/00 | (2012.01) | |
| H04N 1/00 | (2006.01) | |

(52) U.S. Cl.
CPC .......... *G03G 15/55* (2013.01); *G03G 15/5079* (2013.01); *G06Q 10/06* (2013.01); *G06Q 10/063112* (2013.01); *G06Q 10/087* (2013.01); *G06Q 10/20* (2013.01); *H04N 1/00344* (2013.01); *G03G 15/553* (2013.01)

(58) Field of Classification Search
USPC .......................................................... 705/8
See application file for complete search history.

(56) References Cited

U.S. PATENT DOCUMENTS

| | | | |
|---|---|---|---|
| 6,625,403 B2 | 9/2003 | Carling et al. .................. 399/24 |
| 6,718,285 B2 | 4/2004 | Schwartz et al. ............. 702/184 |
| 7,089,153 B2* | 8/2006 | Carling et al. ................ 702/182 |
| 7,355,730 B2* | 4/2008 | Landau et al. ............... 358/1.14 |
| 7,647,534 B2* | 1/2010 | Castellani et al. ............. 714/46 |
| 7,881,985 B2* | 2/2011 | Yang et al. ...................... 705/28 |
| 2002/0110380 A1* | 8/2002 | McIntyre ........................ 399/15 |
| 2005/0222933 A1* | 10/2005 | Wesby .................. G06Q 40/00 705/36 R |
| 2006/0124764 A1* | 6/2006 | Guskov et al. ............... 239/101 |
| 2007/0204230 A1* | 8/2007 | Carling et al. ................ 715/733 |
| 2007/0299706 A1* | 12/2007 | Galt et al. ........................ 705/7 |
| 2008/0278755 A1* | 11/2008 | Martin ......................... 358/1.16 |
| 2009/0119066 A1* | 5/2009 | Strong et al. ................. 702/184 |
| 2010/0031092 A1* | 2/2010 | Dokken ......... G01R 31/318552 714/45 |

FOREIGN PATENT DOCUMENTS

| | | |
|---|---|---|
| DE | 102007046346 A1 | 4/2009 |
| DE | 102007046346 A1 * | 4/2009 |

OTHER PUBLICATIONS

U.S. Appl. No. 11/362,907, filed Aug. 30, 2007, Carling.

* cited by examiner

*Primary Examiner* — Thomas L Mansfield, Jr.
(74) *Attorney, Agent, or Firm* — Kevin Soules; Kermit D. Lopez; Luis M. Ortiz (57) ABSTRACT

A method and system for managing field convertible operator replaceable components associated with a rendering device. A file that defines a set of operator replaceable components can be created and remotely installed on the device. The replaceable components associated with the device can be easily changed from a designation as a customer service engineer replacement component to an operator replacement component and vice versa. A determination that an operator is allowed to replace the component can be made based on a training level provided to the operator, the component availability, a usage pattern, and/or a security level. Such an approach enables the operator to perform the majority of maintenance on the device without requiring the services of a field engineer.

18 Claims, 5 Drawing Sheets

METHOD AND SYSTEM FOR MANAGING FIELD CONVERTIBLE CUSTOMER REPLACEABLE COMPONENTS

TECHNICAL FIELD

Embodiments are generally related to rendering devices and techniques. Embodiments also relate in general to the field of computers and similar technologies, and in particular to software utilized in this field. In addition, embodiments relate to HFSI (High Frequency Service Item), CRU (Customer Replaceable Unit) and Operator Replaceable Component (ORC) devices associated with complex systems.

BACKGROUND OF THE INVENTION

Rendering devices (e.g., printers, scanners, fax machines, photo copy machines, etc.) often include components that wear with usage and eventually require replacement. For example, laser printers typically include internal rollers for transporting print media, an electrophotographic drum for transferring toner to the print media, and a fuser for fusing toner to the print media. Such components wear with usage and may need to be replaced, sometimes more than once, during the life of the rendering device. An HFSI is an integral component that can be replaced at the end of life or at the time of premature failure of one or more components. HFSI components enable a variety of machine subsystems to be incorporated into a single unit while maximizing the useful life of each component.

A typical HFSI (the parent) can be configured from multiple components (the children), each component having an independent HFSI counter. A number of such counters may each be associated with a particular replaceable component so that the HFSI counters can be reset independently. Such counters can be utilized for scheduling replacement of the individual component when the counter associated with the component attains a predetermined threshold value, or when directed to in concert with service documentation. The "parent" component needs to be replaced completely when any of the "child" components reach a count indicative of the need for replacement.

The replacement of such components requires service professionals such as, for example, a CSE (Customer Service Engineer) to repair and replace the components that wear during periods of normal use. CSE visits are expensive and should be avoided if possible. For this reason, particularly high frequency service actions are packaged as Operator Replaceable Components (ORCs) or Customer Replacement Units (CRUs).

Occasionally it is desired to reduce service costs by converting a CSE replaceable component to an Operator Replaceable Component. Most prior art solutions involve the conversion of a component from a customer replaceable component to a CSE replaceable component by updating an installed software module in order to change the component from the CSE to the customer replaceable unit, which is an infrequent event. Such software modules require associated training materials in order for an individual to make the adjustment, which is expensive, and rarely done.

In order to reduce the costs associated with replacing a CSE replaceable unit to customer replaceable component, it is believed that a need exists for an improved method and system for managing field convertible customer replaceable components associated with a particular device such as, for example, a rendering device. A need also exists for providing a remote access for managing replaceable components.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved rendering device such as, for example, a printer, fax machine, scanner, photo copy machine and the like.

It is another aspect of the present invention to provide for an improved method and system for managing field convertible customer replaceable components associated with a particular rendering device.

It is a further aspect of the present invention to provide for an improved method and system for converting a CSE replaceable component to an operator replacement component and vice versa.

The aforementioned aspects and other objectives and advantages can now be achieved as described herein. A method and system for managing field convertible operator replaceable components associated with a rendering device is disclosed herein. An XML based file can be configured, which defines a set of operator replaceable components, and then remotely installed on the rendering device. The replaceable components associated with the rendering device can easily be changed from a designation as a customer service engineer (CSE) replacement component to an operator replacement component (ORC) and vice versa. A determination that an operator is allowed to replace the component can be provided, based on a training level provided to the operator, component availability, a usage pattern, and/or a security level. Such an approach enables adjustment of the level of service provided by the operator to match the level of training and service contract of the particular device.

Additionally, such factors can also be utilized to adjust a service interval associated with the component. The XML based file can be updated via a remote service provider. The component can be replaced by the operator based on the training level provided to the operator and the availability of the replacement part. If the replacement part is not available in an on-site locker, then the operator replaceable component cannot be available to the operator. The high frequency service items that are utilized more frequently can be traced and such items are replaced by the operator when needed. The operator can be granted varying levels of access to the operator replaceable components based on particular security levels, thereby providing a multi-tier service within a customer environment.

The customer may be required to provide a confirmation related to a change associated with the operator replacement component in order to provide the customer more (or less) access to high frequency service items. Such an approach of adding to and removing operator replacement component from the set can automatically change the auto-parts reordering system. The operator replacement component can be independently enabled and disabled on a per customer or per-event basis. The customer capable of performing more regular service can be able to accept more responsibility in replacing the components in order to reduce cost to an organization. Such an approach provides an improved reliability for the device as the components can be replaced when required and not driven solely based on the CSE availability.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
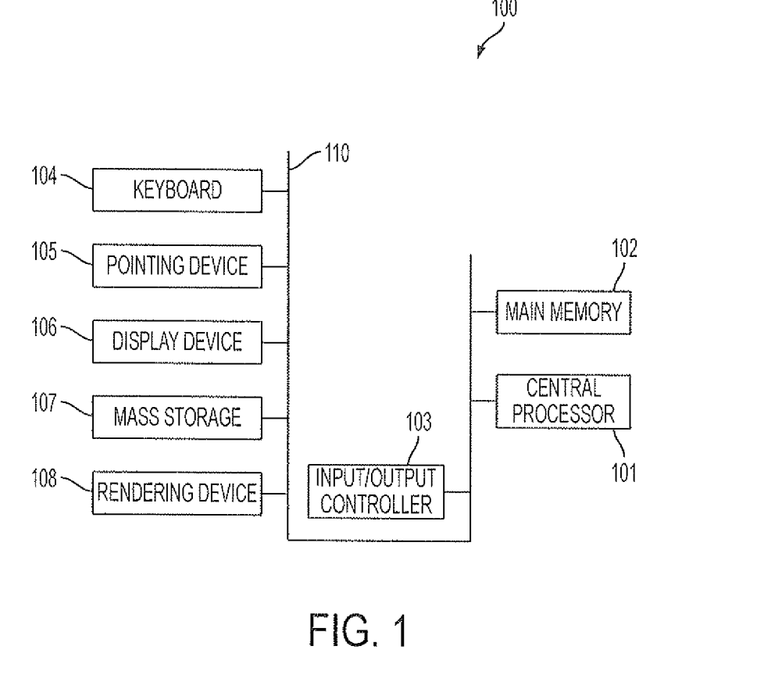
FIG. 1 illustrates a schematic view of a data-processing system in which the present invention may be embodied.
Figure 2:
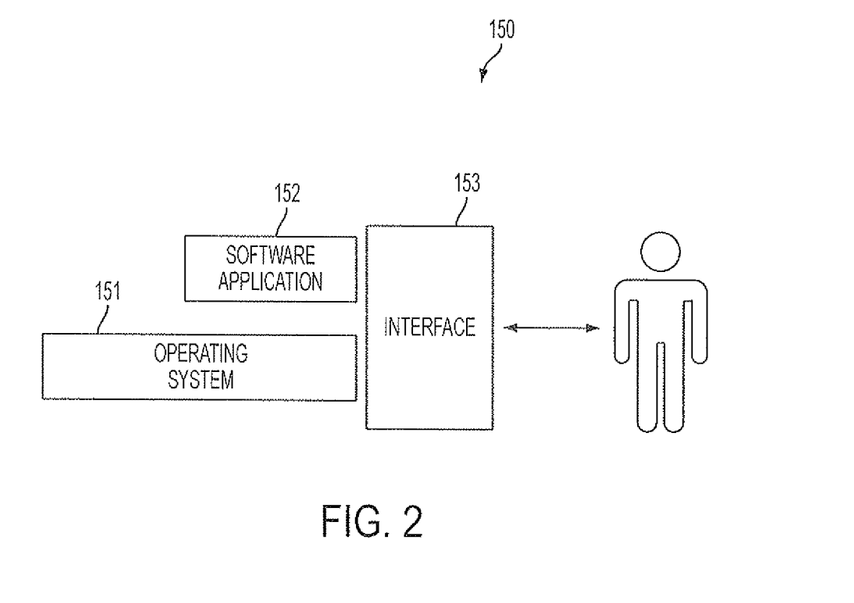
FIG. 2 illustrates a schematic view of a software system including an operating system, application software, and a user interface for carrying out the present invention.
Figure 3:
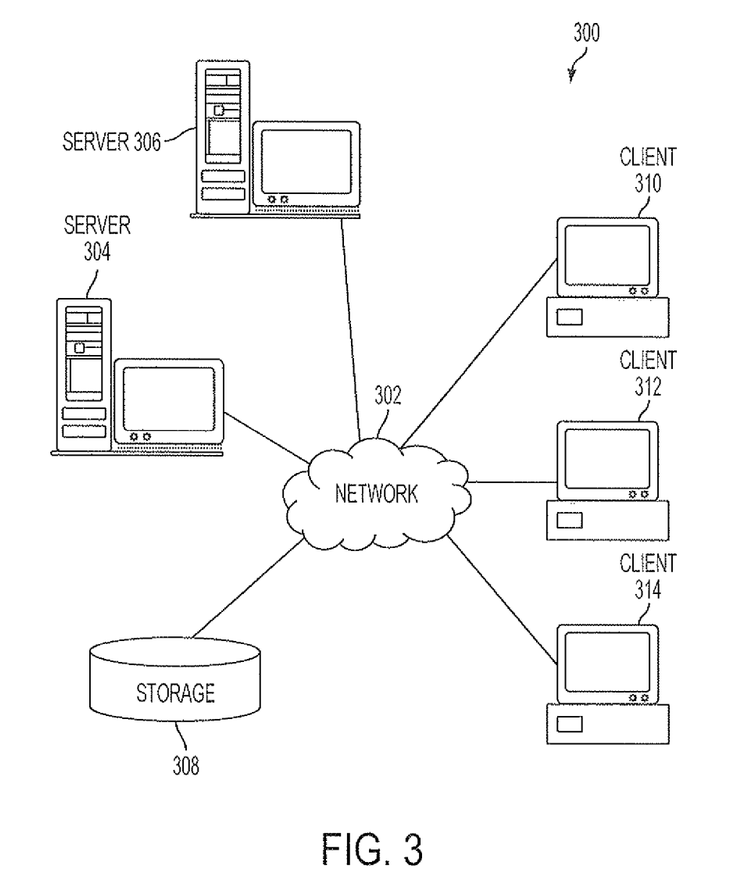
FIG. 3 illustrates a graphical representation of a network of data processing systems in which aspects of the present invention may be implemented.

FIGS. 1-3 are provided as exemplary diagrams of data processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 1, the present invention may be embodied in the context of a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a rendering device 108, may be included in the data-processing apparatus 100 as desired. Note that the rendering device 108 may constitute, for example, a printer, a copier, fax machine, scanner, and/or other types of rendering components, depending upon design considerations. As illustrated, the various components of the data-processing apparatus 100 communicate through a system bus 110 or similar architecture.

FIG. 2 illustrates a computer software system 150 for directing the operation of the data-processing apparatus 100 depicted in FIG. 1. Software system 150, which is stored in system memory 102 and on disk memory 107, can include a kernel or operating system 151 and a shell or interface 153. One or more application programs, such as application software 152, may be "loaded" (i.e., transferred from storage 107 into memory 102) for execution by the data-processing apparatus 100. The data-processing apparatus 100 receives user commands and data through user interface 153; these inputs may then be acted upon by the data-processing apparatus 100 in accordance with instructions from operating module 151 and/or application module 152.

The interface 153, which is preferably a graphical user interface (GUI), also serves to display results, whereupon the user may supply additional inputs or terminate a given session. In one possible embodiment, operating system 151 and interface 153 can be implemented in the context of a "Windows" system. It can be appreciated, of course, that other types of systems are possible. For example, rather than a traditional "Windows" system, other operation systems such as, for example, Linux may also be employed with respect to operating system 151 and interface 153. Application module 152, on the other hand, can include instructions such as the various operations described herein with respect to the various components and modules described herein such as, for example, the method 500 depicted in FIG. 5.

FIG. 3 illustrates a graphical representation of a network of data processing systems in which aspects of the present invention may be implemented. Network data processing system 300 is a network of computers in which embodiments of the present invention may be implemented. Network data processing system 300 contains network 302, which is the medium used to provide communications links between various devices and computers connected together within network data processing apparatus 100. Network 302 may include connections such as wire, wireless communication links, or fiber optic cables.

In the depicted example, server 304 and server 306 connect to network 302 along with storage unit 308. In addition, clients 310, 312, and 314 connect to network 302. These clients 310, 312, and 314 may be, for example, personal computers or network computers. Data-processing apparatus 100 depicted in FIG. 1 can be, for example, a client such as client 310, 312, and/or 314. Alternatively, data-processing apparatus 100 can be implemented as a server such as servers 304 and/or 306, depending upon design considerations.

In the depicted example, server 304 provides data such as boot files, operating system images, and applications to clients 310, 312, and 314. Clients 310, 312, and 314 are clients to server 304 in this example. Network data processing system 300 may include additional servers, clients, and other devices not shown. Specifically, clients may connect to any member of a network of servers which provide equivalent content.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network data processing system 300 also may be implemented as a number of different types of networks such as, for example, an intranet, a local area network (LAN), or a wide area network (WAN). FIG. 1 is intended as an example and not as an architectural limitation for different embodiments of the present invention.

The following description is presented with respect to embodiments of the present invention, which can be embodied in the context of a data-processing system such as data-processing apparatus 100 and computer software system 150 depicted respectively FIGS. 1-3. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 4:
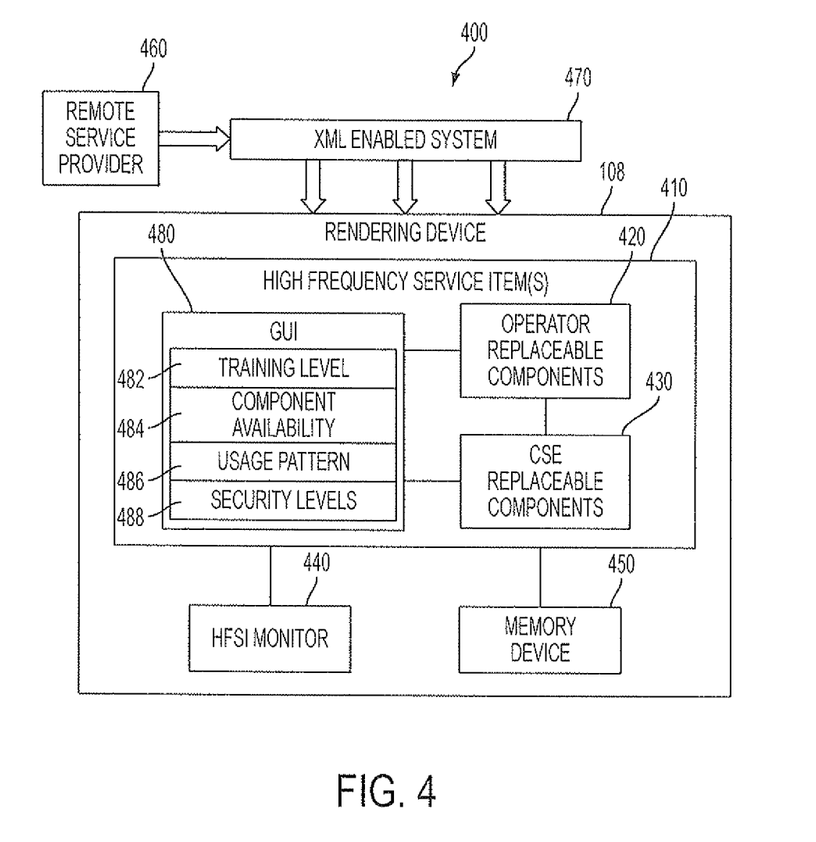
FIG. 4 illustrates a block diagram of a rendering device associated with one or more high frequency service items, in accordance with a preferred embodiment.

FIG. 4 illustrates a block diagram 400 of a rendering device 108, which can be associated with HFSI 410, in accordance with a preferred embodiment. Note that in FIGS. 1-5, identical or similar blocks are generally indicated by identical reference numerals. FIG. 4 schematically depicts a rendering device 108 incorporating features discussed herein with respect to example embodiments. It can be appreciated, of course, that the following discussion related to high frequency service items 410 of the present invention may be employed in a wide variety of devices and is not specifically limited in its application to the particular embodiment depicted herein. The data-processing apparatus 100 can be utilized to generate a document in an electronic form and to transmit the document (in the form of a rendering job) to the rendering device 108. The rendering device 108 receives the rendering job and prints the document.

In general, high frequency service items can be defined as an integral component to modern rendering devices such as rendering device 108 to help a service personnel know when to replace components associated with the rendering device 108. The more complex products can possess several hundred high frequency service items and the components are mechanically and electrically related to each other. The service items 410 are often highly related to other service items 410 associated with the rendering device 108, which need replacement after a certain count of instances the service items 410 are serviced.

The service items 410 may represent any component in the rendering device 108 that is subject to wear over the life of the rendering device 108. For example, the component rendering device 108 may comprise high frequency service items 410 such as, for example, a photoreceptor cartridge, a developer cartridge, a toner cartridge, an ink cartridge, print head, and print cartridge each of which is generally designed to function for a preset number of images in the form of prints or copies. These components are described for purposes of clarity and specificity; however, they should not be interpreted in any limiting way.

The service items 410 further include a memory device 450 and a HFSI monitor 440 integral therewith. The service items 410 may include multiple memories of different types such as, for example, ROM, RAM, EEPROM, magnetic, or optical. Data relating to the service items 410 may be stored in the memory device 450. For example, a preset number of total images for the service items 410, various threshold(s) values associated with the service items 410, and various predetermined information can be stored in the memory device 450. The memory device 450 can receive data for each of the components associated with the HFSI 410 that details the usage of each of the components based on the number of prints made, the types of paper being used, the color composition of the printed pages as well as various sensor inputs. The memory device 450 can also prompt the operator when any of the components need to be replaced.

The components associated with the service items 410 can be classified as an operator replaceable component 420 and a CSE replaceable component 430. The operator replaceable components 420 as envisioned by the present invention are those components within the device 108 that become worn after periods of use. Additionally, the CSE replaceable components 430 as envisioned by the preferred embodiment herein are those components utilized within the rendering device 108 that wear with use. The operator replaceable components 420 and the CSE replaceable components 430 within the preferred embodiment have predictable lifetimes that can be anticipated by parameters relative to the use of the rendering device 108.

An XML enabled system 470 can be utilized to configure the relationship between the operator replaceable component 420 and the CSE replaceable component 430 associated with the rendering device 108. The XML enabled system 470 can be created and remotely installed on the rendering device 108. The XML based system 470 can be updated via a remote service provider 460 in order to change the service relationship between the service items 410, if needed. The replaceable components associated with the rendering device 108 can easily be changed from a designation as the CSE replacement component 430 to the operator replacement component 420 and vice versa. The determination that an operator can be allowed to replace the component can be made based on criteria such as, for example, a training level 482 provided to the operator, the component availability 484, a usage pattern 486 of a customer, and/or a particular security level 488. Depending on the patterns of usage, for example, of a customer (e.g., heavy weight vs. light weight stock paper), one can change the frequency and criteria for HFSI replacement. Other criteria include, for example, fault patterns. That is, depending on a set of faults detected on the device, the criteria for CSE or customer replacement could change. A customer who is having more difficulty (e.g., higher faults) can be offered the opportunity to replace some of these parts themselves without waiting for a CSE, and in some cases, in combination with a certain amount of extra training or certification.

The customer may be required to provide a confirmation related to a change associated with the operator replacement component 420 in order to provide the customer more (or less) access to high frequency service items 410. Such an approach of adding to or removing the operator replacement component 420 from the set can automatically change an auto-parts reordering system. The operator replacement component 420 can be independently enabled and disabled on a per customer or per-event basis. Note that the embodiments discussed herein generally relate to a rendering device. It can be appreciated, however, that such embodiments can be implemented in the context of other systems and devices and are not limited to the rendering device. The discussion of rendering devices, as utilized herein, is presented for general illustrative purposes only.

Figure 5:
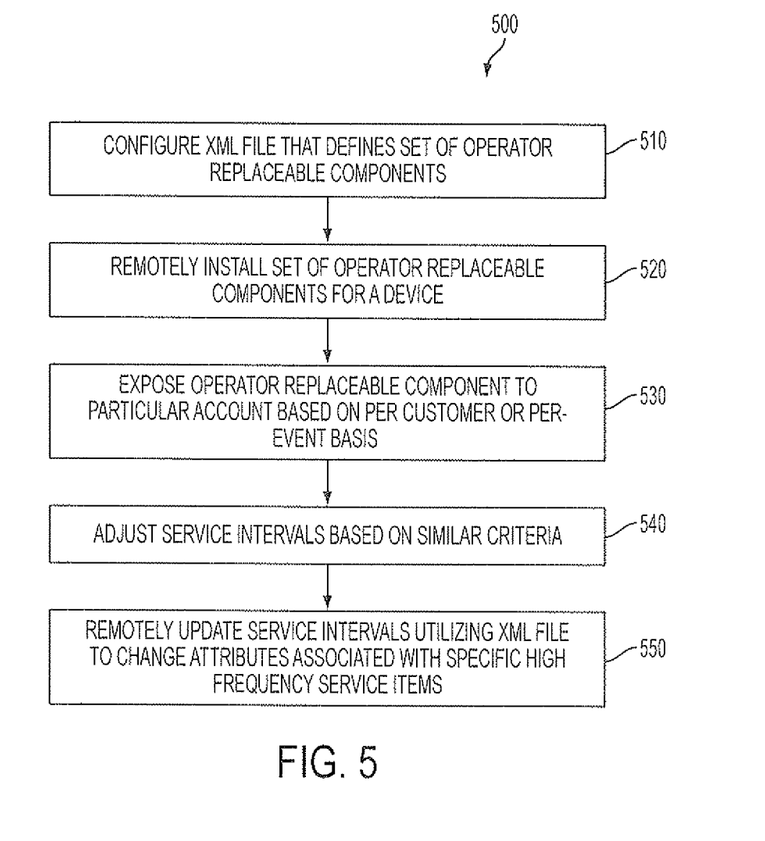
FIG. 5 illustrates a detailed flow chart of operations illustrating logical operational steps of a method for managing field convertible operator replaceable components, in accordance with a preferred embodiment.

FIG. 5 illustrates a flow chart of operations depicting a method 500 for managing field convertible operator replaceable components, in accordance with a preferred embodiment. Note that the method 500 can be implemented in the context of a computer-usable medium that contains a program product. The method 500 depicted in FIG. 5 can also be implemented in a computer-usable medium containing a program product.

Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the method 500 described herein can be deployed as process software in the context of a computer system or data-processing system as that depicted in FIGS. 1-3.

The XML enabled file 470 that defines a set of operator replacement component 420 can be configured, as illustrated at block 510. The set of operator replacement component 420 associated with the rendering device 108 can be remotely installed, as shown at block 520. The XML enabled file 470 can be updated via the remote service provider 460. The XML based file 470 can be utilized to update the service intervals to change the attributes of specific HFSI's 410 (high frequency service items). The operator replaceable component 420 can be exposed to a particular account based on per customer or per-event basis, as depicted at block 530.

The determination that the operator can be allowed to replace a component can be made if the operator is provided with a particular level of training 482. For example, if the operator completes an optional "ACT" training, then an additional set of operator replaceable component 420 can appear allowing the operator to service the rendering device 108 without waiting for a field engineer. The component can be replaced by the operator based on the component availability 484. For example, if an auto-parts ordering system indicates that a component is not available at an on-site locker, then the operator replaceable component 420 will not be available to the operator. Further, the operator replaceable component 420 can be available only to the CSE.

The component can also be replaced by the operator based on the usage patterns 486. For example, a company may employee Pareto analysis to determine that 20% of the operators are responsible for a disproportionate percentage of the service costs. Such an approach can be traced to a few high frequency service items that are utilized more frequently than the general population because of the customer's usage patterns and a job demographic. The company can provision such accounts to replace these components saving the company money without having to change the general diagnostic procedures for the entire fleet. The CSE may temporarily provision such accounts to replace the components because the components are almost due and the customer possesses the ability to replace the components.

The component can also be replaced by the operator based on the user security 488. For example, the customers can be granted different levels of access to the operator replaceable components 420 based on the security levels. Such an approach can allow multi-tier service within a customer environment. A service interval associated with the HFSI 410 can also be adjusted based on the similar criterion, as depicted at block 540. The service intervals can be remotely updated utilizing the XML based file 470 to change the attributes associated with the specific HFSI 410, as illustrated at block 550. For example, the attributes of the specific HFSI 410 can be changed utilizing the HFSI Id <HFSI id="12" orc="true" threshold="123456"/>.

Such a method 500 can be utilized to change the replaceable components associated with the rendering device 108 from designation as the customer service engineer replacement component 430 to the operator replacement components 420 and vice versa. Such an approach allows different devices and software levels to possess different access levels to specific replaceable parts. The XML enabled file 470 can be downloaded to the entire device 108 that changes the attributes of the HFSI 410 to make the HFSI 410 no longer customer replaceable.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It is believed that by utilizing the system and approach described herein, the operator replacement components 420 can be independently enabled and disabled on per customer or pre-event basis. The customer capable of more regular service can be able to accept more responsibility in replacing the components, thereby reducing down time and service costs. Such an approach provides an improved reliability for the device as the components can be replaced when required and not driven solely based on the CSE availability.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method for remotely managing the replacement of components in an electromechanical device, said method comprising:
    defining via a computer processor high frequency service items comprising a set of replaceable components including at least one replaceable component comprising a high frequency service item said high frequency service items comprise components in said device that are subject to wear over the life of said device;
    analyzing an electromechanical device utilizing a computer processor, the device having said at least one replaceable component among said set of replaceable components, wherein a replacement of the at least one replaceable component is assigned a replacement service level designation;
    transmitting a service order by the device via a computer processor to a remotely located service administrator in response to analyzing the device, the transmission including data indicative of said at least one replaceable component and said replacement service level designation;

reviewing the service request and additional criteria by the remotely located service administrator via a computer processor to determine alternate remedies to address the service request; and automatically altering said replacement service level designation via a computer processor to an alternative replacement service level designation based on the additional criteria said automatically altering said replacement service level designation further comprising downloading executable instructions at the device, the executable instructions to change the replacement service level designation of the at least one replaceable component based on the additional criteria, to allow said at least one replaceable component to be independently enabled and disabled and exposed to a particular account on a per customer or per-event basis.

2. The method of claim 1 wherein said additional criteria further comprises inventory data.

3. The method of claim 2 wherein said inventory data further comprises a current inventory with respect to a customer locker.

4. The method of claim 2 wherein said inventory data further comprises a current inventory with respect to a CSE locker.

5. The method of claim 2 wherein said additional criteria further comprises a pattern of usage of said device by a customer.

6. The method of claim 5 wherein said additional criteria further comprises a fault pattern detected with respect to said device.

7. The method of claim 5 wherein said additional criteria further comprises varying degrees of security levels associated with said device, wherein customers are granted with said varying degrees of security levels of access to said at least one replaceable component based on said varying degrees of security levels to permit a multi-tier service within a customer environment, said at least one replaceable component comprising an operator replaceable component.

8. The method of claim 1 further comprising:
configuring a relationship between replaceable components among said set of replaceable components including said at least one replaceable component via an XML enabled system including at least one XML based file that defines and remotely installs said set of replaceable components on said device;
updating said XML enabled system via a remote service provider in order to change a service relationship between said high frequency service items; and
employing said at least one XML based file to update service intervals to change attributes of specific high frequency service items among said high frequency service items.

9. A system for remotely managing the replacement of components in an electromechanical device, said system comprising:
a processor;
a data bus coupled to the processor; and
a non-transitory computer-usable medium embodying computer code, the computer-usable medium being coupled to the data bus, the computer program code comprising instructions executable by the processor and configured to:
define high frequency service items comprising a set of replaceable components including at least one replaceable component comprising a high frequency service item said high frequency service items comprise components in said device that are subject to wear over the life of said device;
analyze a device having at least one replaceable component among said set of replaceable components, wherein said at least one replaceable component is assigned a particular replacement service level designation to be utilized to notify an entity to replace said at least one replaceable component based on the particular replacement service level designation;
reviewing the notification and additional criteria by the remotely located service administrator to determine alternate remedies to address the notification; and
automatically altering said particular replacement service level designation of said at least one replaceable component to an alternative service level replacement designation based on the additional criteria, in response to analyzing said device and the additional criteria said automatically altering said replacement service level designation further comprising downloading executable instructions at the device, the executable instructions to change the replacement service level designation of the at least one replaceable component based on the additional criteria, to allow said at least one replaceable component to be independently enabled and disabled and exposed to a particular account on a per customer or per-event basis.

10. The system of claim 9 wherein said additional criteria comprises inventory data and a training level.

11. The system of claim 10 wherein said inventory data further comprises a current inventory with respect to a customer locker.

12. The system of claim 10 wherein said inventory data further comprises a current inventory with respect to a CSE locker.

13. The system of claim 10 wherein said additional criteria further comprises a pattern of usage of said device by a customer.

14. The system of claim 10 wherein said additional criteria further comprises a fault pattern detected with respect to said device.

15. The system of claim 10 wherein said additional criteria further comprises varying degrees of security levels associated with said device, wherein customers are granted with said varying degrees of security levels of access to said at least one replaceable component based on said varying degrees of security levels to permit a multi-tier service within a customer environment, said at least one replaceable component comprising an operator replaceable component.

16. The system of claim 9 further comprising an XML enabled system that includes at least one XML based file, wherein a relationship between replaceable components among said set of replaceable components including said at least one replaceable component is configured via said XML enabled system including said at least one XML based file, which defines and remotely installs said set of replaceable components on said device.

17. The system of claim 16 wherein said instructions are further configured for:
updating said XML enabled system via a remote service provider in order to change a service relationship between said high frequency service items; and
employing said at least one XML based file to update service intervals to change attributes of specific high frequency service items among said high frequency service items.

18. A system for remotely managing field convertible customer replaceable components in an electromechanical device, said system comprising:
- an XML enabled system that communicates through a computer network with a remote service provider;
- an electromechanical device having a set of high frequency service items (HFSI) wherein some of said high frequency service items comprise operator replaceable components and CSE replaceable components said high frequency service items comprise components in said device that are subject to wear over the life of said device, wherein said electromechanical device communicates with and receives instructions and data from said XML enabled system and wherein said XML enabled system is remotely installable via a processor on said electromechanical device and is updated via said remote service provider to change a service relationship between said high frequency service items;
- an HFSI monitor for monitoring via a processor said high frequency service items; and
- a non-transitory computer readable storage device that communicates with said HFSI monitor and which receives data associated with said operator replaceable components and said CSE replaceable components associated with said set of high frequency service items, said data detailing a usage of each component among said operator replaceable components and said CSE replaceable components to automatically alter replacement service level designations said automatically altering said replacement service level designation further comprising downloading executable instructions at the device, the executable instructions to change the replacement service level designation of the at least one replaceable component based on the additional criteria, to alternative replacement service level designations with respect to said high frequency service items and allow replaceable components among said high frequency service items to be independently enabled and disabled on a per customer or per event basis.

* * * * *